United States Patent
Zhou (10) Patent No.: US 11,099,934 B2
(45) Date of Patent: Aug. 24, 2021

(54) DATA REBUILDING

(71) Applicant: International Business Machines Corporation, Armonk, NY (US)

(72) Inventor: Xue Qiang Zhou, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 120 days.

(21) Appl. No.: 16/111,807

(22) Filed: Aug. 24, 2018

(65) Prior Publication Data

US 2020/0065191 A1 Feb. 27, 2020

(51) Int. Cl.
| | |
|---|---|
| *G06F 11/00* | (2006.01) |
| *G06F 11/10* | (2006.01) |
| *G06F 11/16* | (2006.01) |
| *G06F 11/20* | (2006.01) |
| *G06F 16/27* | (2019.01) |
| *G06F 16/22* | (2019.01) |

(52) U.S. Cl.
CPC ...... *G06F 11/1092* (2013.01); *G06F 11/1662* (2013.01); *G06F 11/2094* (2013.01); *G06F 16/2237* (2019.01); *G06F 16/27* (2019.01); *G06F 2201/85* (2013.01)

(58) Field of Classification Search
CPC .......... G06F 11/142; G06F 11/1423; G06F 11/1425; G06F 11/16; G06F 11/20; G06F 11/2005; G06F 11/2007; G06F 11/202; G06F 11/2023; G06F 11/2092
USPC ............................................. 714/4.11, 1–57
See application file for complete search history.

(56) References Cited

U.S. PATENT DOCUMENTS

| | | |
|---|---|---|
| 7,941,602 B2 | 5/2011 | Burkey |
| 9,594,652 B1 | 3/2017 | Sathiamoorthy et al. |
| 2005/0071708 A1* | 3/2005 | Bartfai ............... G06F 11/2064 714/6.3 |

(Continued)

FOREIGN PATENT DOCUMENTS

WO 2016178138 A1 11/2016

OTHER PUBLICATIONS

Hou et al., "Balancing I/O Response Time and Disk Rebuild Time in a RAID5 Disk Array", Proceedings of the Twenty-sixth Hawaii International Conference on System Sciences, Jan. 8, 1993, pp. 70-79.

(Continued)

*Primary Examiner* — Sarai E Butler
(74) *Attorney, Agent, or Firm* — Jorge R. Maranto (57) ABSTRACT

The rebuilding process comprises the steps of detecting a failure on a first server that stores a first data and processes input/output requests from an application, redirecting incoming input/output requests from the application to a second server storing a second data. The second data being mirrored from the first data. The process further comprises forming, by the first server, a data loss information that identifies the lost data units in the first data. The process further comprises rebuilding, by the first server, the lost data units in the first data, by using the data that is retrieved from the second data and based on the data loss information by the second server. The process further comprises syncing up data units, other than the lost data units in the first data, with corresponding data in the second data in the second server during the rebuilding process.

13 Claims, 5 Drawing Sheets

(56) References Cited

U.S. PATENT DOCUMENTS

| | | | | |
|---|---|---|---|---|
| 2005/0071710 | A1* | 3/2005 | Micka | G06F 11/2058 |
| | | | | 714/6.12 |
| 2007/0050574 | A1* | 3/2007 | Kaiya | G06F 11/2069 |
| | | | | 711/162 |
| 2009/0222498 | A1* | 9/2009 | Lu | G06F 16/10 |
| 2009/0228648 | A1 | 9/2009 | Wack | |
| 2011/0061049 | A1* | 3/2011 | Kobayashi | G06F 3/0665 |
| | | | | 718/1 |
| 2013/0205166 | A1* | 8/2013 | Nair | G06F 11/1092 |
| | | | | 714/6.22 |
| 2015/0227575 | A1* | 8/2015 | Jaquette | G06F 16/11 |
| | | | | 707/645 |
| 2016/0070496 | A1* | 3/2016 | Cohen | G06F 3/0616 |
| | | | | 711/103 |
| 2016/0092309 | A1* | 3/2016 | Gao | G06F 11/2058 |
| | | | | 714/6.23 |
| 2016/0179644 | A1* | 6/2016 | Wu | G06F 3/0619 |
| | | | | 714/6.22 |
| 2016/0328303 | A1* | 11/2016 | Brandner | G06F 11/1662 |
| 2017/0364427 | A1 | 12/2017 | Blea et al. | |
| 2018/0018239 | A1 | 1/2018 | Kripalani et al. | |
| 2018/0260125 | A1* | 9/2018 | Botes | G06F 3/067 |

OTHER PUBLICATIONS

Lau et al., "An Integrated Approach to Recovery and High Availability in an Updatable, Distributed Data Warehouse", Proceedings of the 32nd international conference on Very large data bases, Sep. 12-15, 2006, pp. 703-714.

* cited by examiner

DATA REBUILDING

BACKGROUND

The present disclosure relates to data storage, and more specifically, to a process, a system, and a computer program product for data rebuilding across servers.

Data is important for nearly all services, and a stable service needs highly reliable data. Redundancy is typically used as a mechanism to ensure that the data remains highly reliable in a storage system. However, redundancy is provided at the expense of storage space. Currently, there are many ways that can be used to provide redundancy. For example, redundant array of independent disks (RAID), erasure code (EC), replication, etc. When a failure occurs, data rebuilding is triggered, and the redundancy is utilized.

Typically, there is a failure tolerance associated with data storage systems with redundancy. The failure tolerance corresponds with the number of simultaneous failures that can be recovered. For example, for a RAID 5 system, one failure can be recovered. For a RAID 6 system, at most two simultaneous failures can be recovered. For a system using typical erasure code, at most two simultaneous failures can be recovered and for a system with three replicated copies, at most two simultaneous failures can be recovered. Data loss occurs if the number of simultaneous failures in a system exceeds its failure tolerance.

SUMMARY

Embodiments of the disclosure provide for a process, a system and a computer program product that satisfy the need of data rebuilding.

According some embodiments of the present disclosure, a process for data rebuilding is provided. The process comprises the acts of, detecting a failure on a first server that stores a first data and that processes input/output requests from an application, redirecting incoming input/output requests from the application to a second server storing a second data. The second data being mirrored from the first data. The process further comprises forming data loss information that identifies lost data units in the first data by the first server. The process further comprises rebuilding, by the first server, the lost data units in the first data, by using data that is retrieved from the second data and based on the data loss information by the second server. The process further comprises syncing up data units, other than the lost data units in the first data, with corresponding data in the second data in the second server during the rebuilding process.

According to another embodiment of the present disclosure, a system for data rebuilding is provided. The system comprises one or more processors and a memory coupled to at least one of the one or more processors. The system also comprises of a set of computer program instructions stored in the memory and executed by at least one of the one or more processors in order to perform an action of, detecting a failure on a first server that stores a first data, processing input/output requests from an application and redirecting incoming input/output requests from the application to a second server storing a second data. The second data being mirrored from the first data. The system further comprises of a set of computer program instructions stored in the memory and executed by at least one of the one or more processors in order to perform action of forming data loss information that identifies lost data units in the first data held within the first server. The system further comprises a set of computer program instructions stored in the memory and executed by at least one of the one or more processors in order to perform an action of rebuilding, by the first server, the lost data units in the first data, by using data that is retrieved from the second data that is based on the data loss information provided to the second server. The system further comprises a set of computer program instructions stored in the memory and executed by at least one of the one or more processors in order to perform the action of syncing up data units, other than the lost data units of the first data, with the corresponding data of the second data in the second server during the rebuilding process.

According to another embodiment of the present disclosure, a computer program product for data rebuilding is provided. The computer program product comprises of a computer readable storage medium having program instructions embodied therewith. The program instructions are executable by a device to cause the device to perform a process. The process comprises the steps of detecting a failure on a first server that stores a first data and processes input/output requests from an application, redirecting incoming input/output requests from the application to a second server storing a second data. The second data being mirrored from the first data. The process further comprises forming a data loss information that identifies lost data units in the first data held within the first server. The process further comprises rebuilding, by the first server, the lost data units in the first data, by using data that is retrieved from the second data that is based on the data loss information provided to the second server. The process further comprises syncing up data units, other than the lost data units in the first data, with corresponding data in the second data in the second server during the rebuilding process.

BRIEF DESCRIPTION OF THE SEVERAL VIEWS OF THE DRAWINGS

In the following, embodiments of the disclosure are explained in greater detail, by way of example only, making reference to the drawings in which.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

Figure 1:
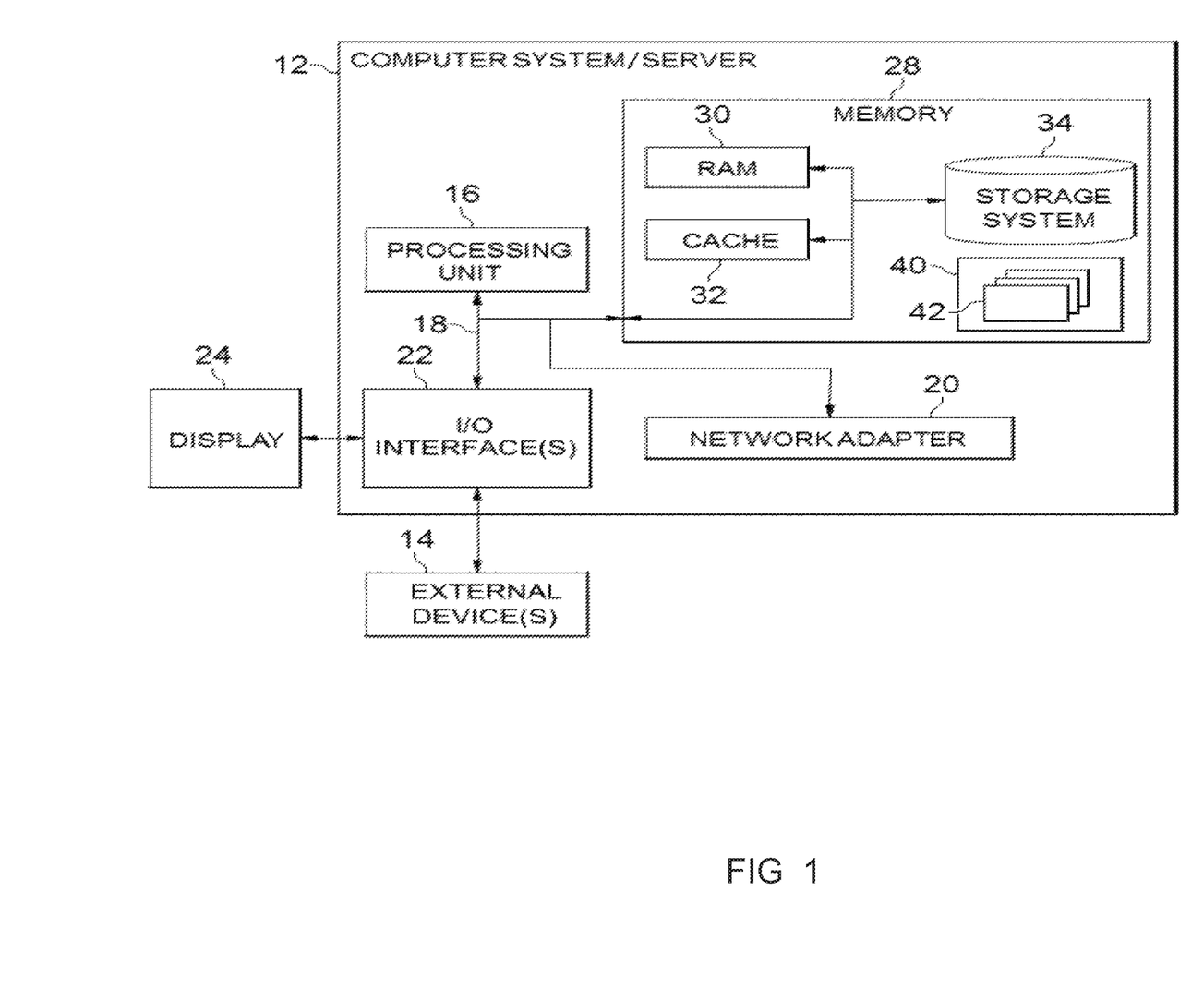
FIG. 1 illustrates an exemplary computer system which is applicable to implement the embodiments of the present disclosure.

Referring now to FIG. 1, in which, an exemplary computer system/server 12 is configured to implement the embodiments of the present disclosure, is shown. FIG. 1 is also adapted to depict an illustrative example of a portable electronic device, such as a communication device, which is also configured to implement the embodiments of the present disclosure. Computer system/server 12 is only illustrative and is not intended to suggest any limitation as to the scope of use or functionality of embodiments of the disclosure described herein.

As shown in FIG. 1, computer system/server 12 depicts the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Besides redundancy internal to a data storage site (herein also referred to as server), an additional data storage site may be used to provide external redundancy. The additional data storage site, also called a secondary site, provides data mirroring for the data storage site, also called a primary site. If the number of simultaneous failures exceeds a failure tolerance at the primary site, for example, if there are two disks failing at the same time at the primary site with a RAID 5 configuration, the following operations will be performed according to prior arts. First, the primary site goes offline and the input/output requests from an application to the primary site are redirected to the secondary site. Second, the secondary site provides services to incoming input/output requests from the application, and copies data to the primary site. At the primary site, all the data stored within the entire primary site is rebuilt offline by using data copied from the secondary site. Lastly, when the data rebuilding process is complete, the input/output requests from the application are redirected back to the primary site for processing. The secondary site returns to work as a data mirror for the primary site.

The data rebuilding process used in prior art is a site level recovery that takes a long time to complete. For a large site, the process may take days to finish the recovery. Aside from the length of time to complete, another problem lies with that process. When the primary site is in the process of data rebuilding, it cannot provide data mirroring for the secondary site. Thus, data in the secondary site is exposed to risks due to a lack of redundancy. Since data in the secondary site lacks backup protection, the longer that the primary site takes to recover, the higher risk the secondary site takes in losing its data. Also, if the secondary site fails during the time window that the primary site performs data rebuilding, all data will be lost.

Figure 2:
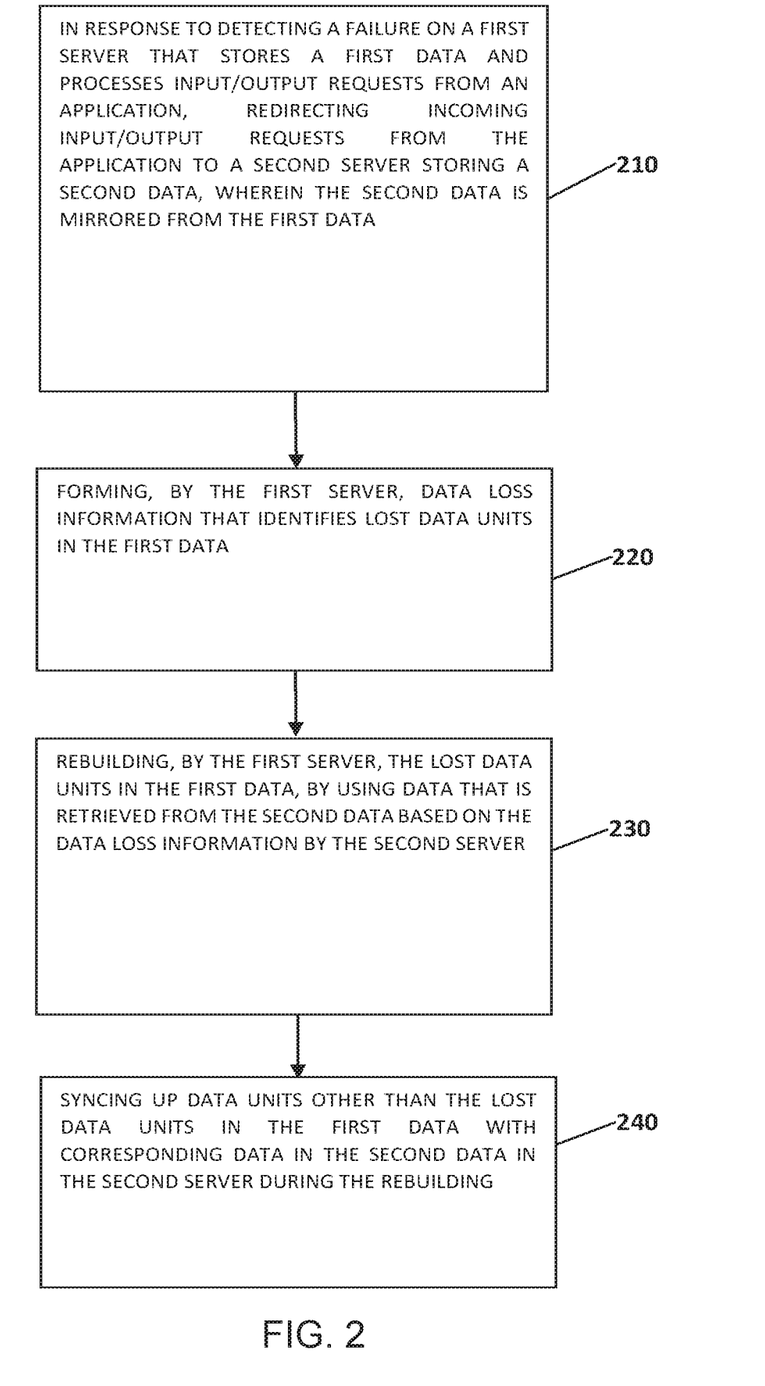
FIG. 2 is a flowchart illustrating a process for data rebuilding according to an embodiment of the present disclosure.

FIG. 2 refers to a flowchart illustrating a process for data rebuilding according to an embodiment of the present disclosure. As shown in FIG. 2, the process for data rebuilding includes redirecting requests at step 210, forming data loss information at step 220, rebuilding lost data at step 230, and syncing up data at step 240. In some embodiments of the disclosure, the process in FIG. 2 is performed in the computer system/server 12 in FIG. 1.

To describe some embodiments of the process in FIG. 2, a RAID 5 configuration is used as an example to ease the understanding of the process. In the context of the disclosure, a server is a site that provides service for input/output (I/O) requests from an application independently and is physically separate from another server. Though the description is based on RAID 5 system, the disclosure is also applicable to other systems such as the one using an erasure code configuration for redundancy.

Figure 3:
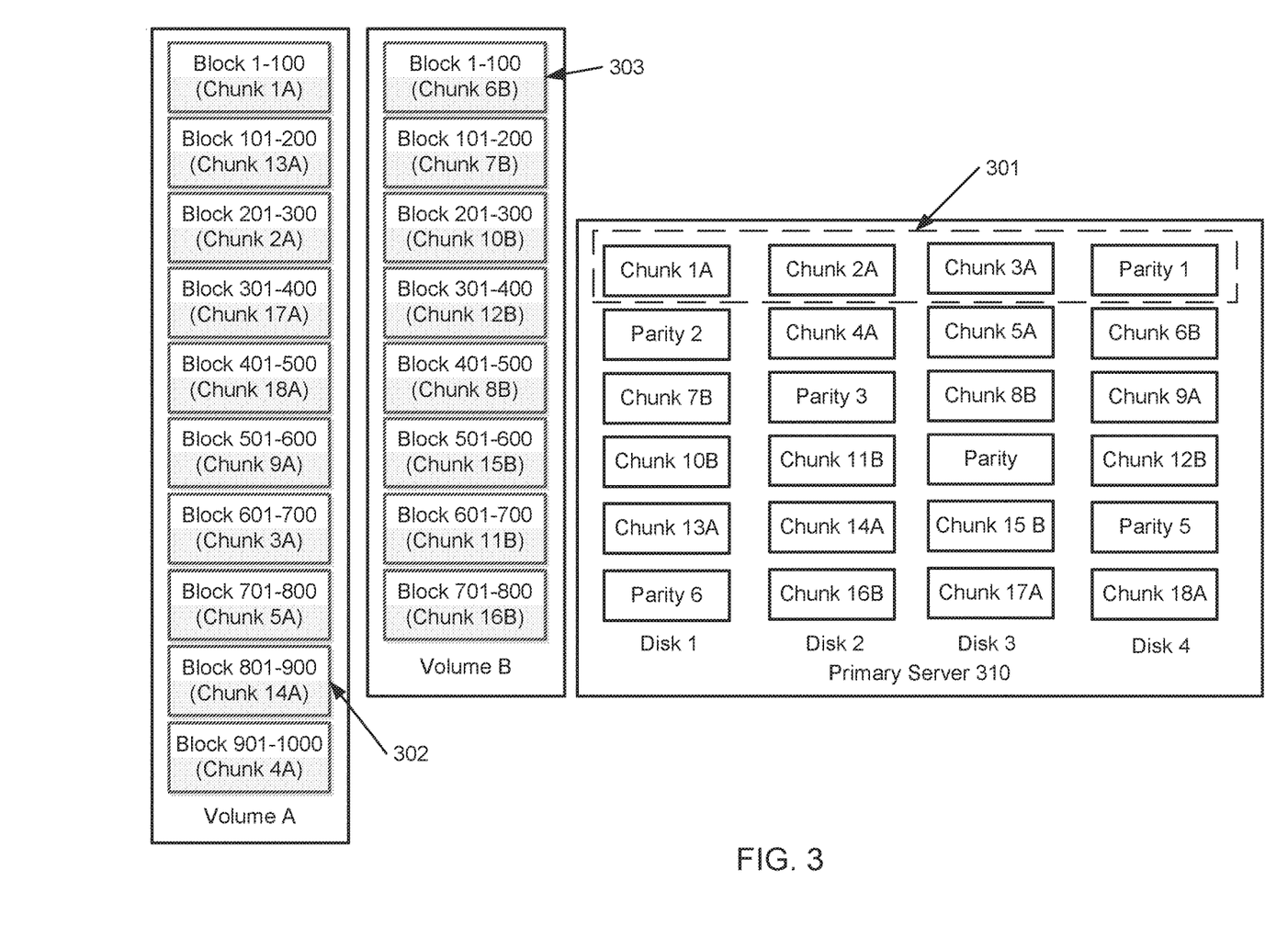
FIG. 3 illustrates an exemplary server based on RAID 5.

FIG. 3 shows an example of a server 310 utilizing a RAID 5 configuration. The server 310 works as a primary server to service I/O requests from an application or operating system. The I/O requests are directed to the data stored in the server 310. The data in the server 310 is spread across a disk group in the server 310. In FIG. 3, the server 310 has a disk group comprising of four disks. Disk 1, disk 2, disk 3 and disk 4 are data storage drives. In some embodiments, a chunk is granularity size used to calculate parity in a RAID algorithm or EC algorithm. The chunk is also the granularity size used for data rebuilding. A block is granularity size used for an application to access data. The block is also the granularity size used to perform data mirroring between a primary server and a secondary server. From another perspective, a chunk is a physical data unit, and a block is a logical data unit.

In FIG. 3, the rectangle of dashed lines, denoted by 301, shows a stride. A stride is a range to calculate parity or to rebuild data. As such, redundancy is maintained by the strides. As shown, stride 301 consist of a chunk 1, a chunk 2, a chunk 3, and a parity 1. The chunks 1-3 may be customer data, while parity 1 comprises of a calculation based on chunks 1-3 utilizing a RAID or EC algorithm. Parity 1 is also considered a chunk, except that it stores redundancy information instead of data per se.

Typically, an application normally accesses data by logical volumes instead of physical chunks. A volume may be comprised of multiple blocks. Current storage systems store a mapping relationship between the blocks and the chunks held within the system. The left side of FIG. 3 provides an example of a mapping relationship organized by volumes. In FIG. 3, the mapping relationship assumes that volumes A and B are in the server 310. The mapping of FIG. 3 depicts that Blocks 1-100, of volume A, are stored in chunk 1. Blocks 101-200, of volume A, are stored in chunk 13. Blocks 1-100, of volume B, are stored in chunk 6, etc. In FIG. 3, the mapping of volume A is denoted as 302. The mapping of volume B is denoted as 303. The mapping relationship in FIG. 3 is controlled by the storage system and managed by configuring metadata. As shown in FIG. 3, data in volume A is spread across the four disks, as indicated by the boxes containing the letter 'A'. The data in volume B is spread across the four disks, as indicated by the boxes containing the letter 'B'. The mapping relationship of 302 and 303 share the same indicating letter as the corresponding chunks in the primary server 310. Specifically, the data in volume A is spread across chunks 1-5, 9, 13-14, 17-18. The data in volume B is spread across chunks 6-8, 10-12, 15-16. The mapping relationship in FIG. 3 is given as an example to describe the disclosure. Other mapping relationships may be utilized. For example, a chunk may correspond to a different number of blocks.

Figure 4:
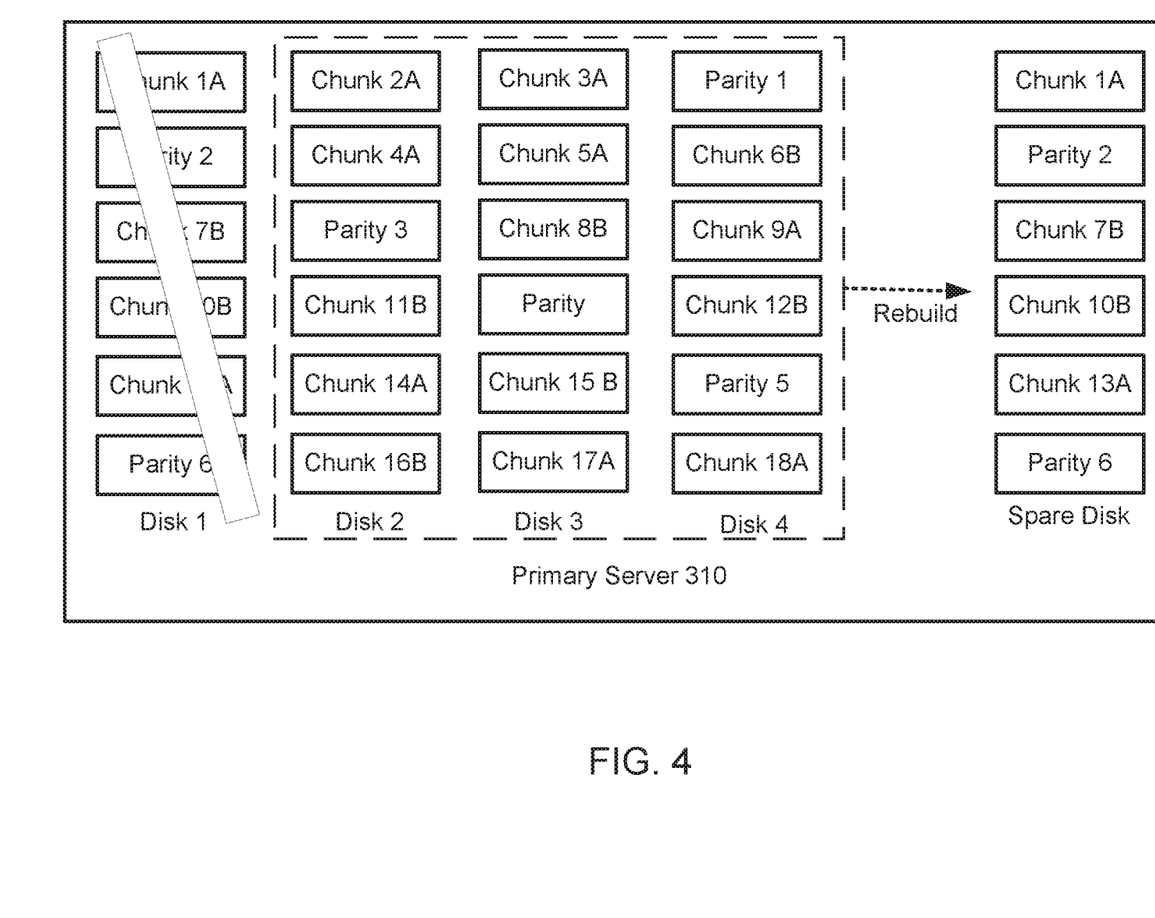
FIG. 4 illustrates an example where disk 1 in the primary server fails.

If only one disk fails in the server 310, the server 310 is able to recover through internal mechanisms. FIG. 4 depicts an example where disk 1, in the server 310, fails. In this scenario, a spare disk is used to rebuild the lost data of disk 1. In the server 310, data rebuilding is performed stride by stride. For example, chunk 1 in the spare disk is rebuilt from chunk 2 in disk 2, chunk 3 in disk 3, and parity 1 in disk 4. Thus, the first stride is restored. Parity 2 in the spare disk is calculated from chunk 4 in disk 2, chunk 5 in disk 3, and chunk 6 in disk 4. Thus, the second stride is restored, etc. Once all the lost data is rebuilt in the spare disk, the spare disk will then replace disk 1 and work in conjunction with disks 2-3 as a new disk group to provide services.

In the event that two disks fail simultaneously within the server 310, the server 310 is unable to recover utilizing internal mechanisms. This is because the number of simultaneous failures in the server 310 exceeded its failure tolerance. In this case, the server 310 needs the data from a secondary server or a backup server to rebuild the lost data. The secondary server contains mirrored data of the data in the primary server, so the lost data in the primary server can be retrieved from the secondary server.

Figure 5:
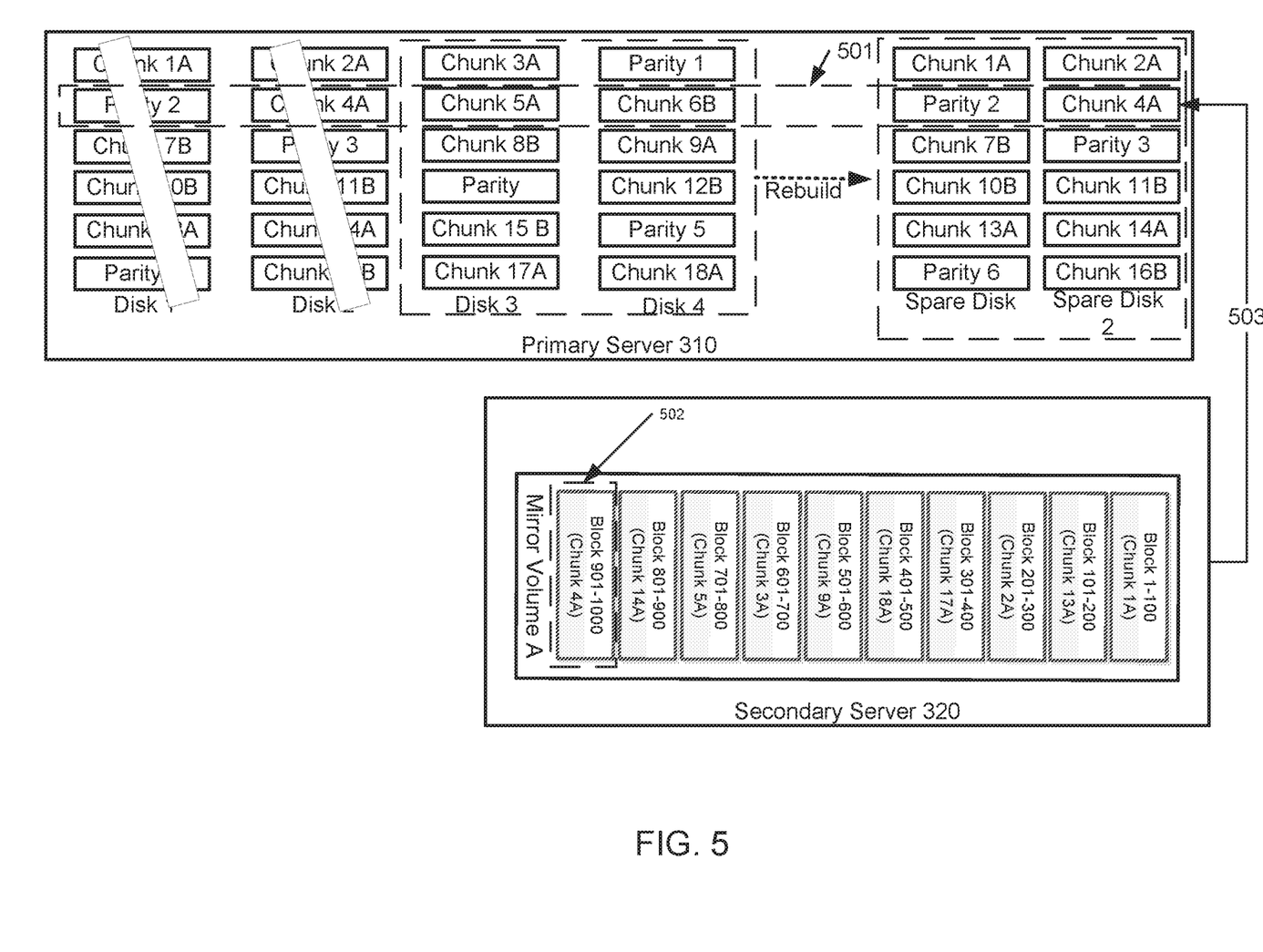
FIG. 5 illustrates the data rebuilding when two disks fail simultaneously in the primary server 310 in FIG. 3.

In response to detecting a failure of two disks failing simultaneously, the data rebuilding process in FIG. 2 begins according to embodiments of the disclosure. FIG. 5 shows the data rebuilding process when two disks fail simultaneously in the primary server 310 in FIG. 3. In FIG. 5, as an example, disk 1 and disk 2 fail at the same time, thus chunks 1-2, 4, 7, 10-11, 13-14, 16 and parities 2-3, 6 are lost and cannot be recovered internally using the data units that have not failed.

In FIG. 2, step 210 begins in response to detecting a failure on a first server that stores a first data and that processes input/output requests from an application. The incoming input/output requests from the application are redirected to a second server storing a second data, wherein the second data is mirrored from the first data. As described, the lost data units in the first data cannot be recovered by using data units that have not failed in the first server. Utilizing FIG. 5 as an example, the primary server 310 initially services I/O requests from an application, and the secondary server 320 functions as data mirror for the primary server 310. That is, data in the secondary server 320 (the second data) is mirrored from and synced up with the data in the primary server 310 (the first data). In response to two disks in the primary server 310 failing at the same time, all subsequent incoming I/O requests from the application are redirected to the secondary server 320. The secondary server 320 processes the I/O requests by using the mirrored data. Meanwhile, the primary server 310 starts to rebuild its lost data.

At step 220, a data loss information is formed by the first server. The data loss information identifies the lost data units in the first data. In some embodiments, the formed data loss information may be sent to the second server. In other embodiments, the formed data loss information may be sent to a third party and the second server is able to retrieve it from the third party. In other embodiments, the data loss information may comprise of a bitmap in which a bit represents a data unit. A bit in the bitmap may also indicate if the data unit, that is represented, is a lost data unit. For example, a bit may be set to 1 to indicate that the corresponding data unit is a lost data unit. In another example, a bit may be set to 0 to indicate that the corresponding data unit is a lost data unit. In FIG. 5, the lost data units are lost chunks, that include lost data chunks and parity chunks. A chunk is the unit size for rebuilding lost data. In some embodiments, the bitmap may be organized by volumes. For example, each row of bits in the bitmap represents a volume, and each bit represents a block range (e.g., block 201-300). On the other hand, the primary server 310 can identify which chunks are lost from the metadata of the storage system. That is, the primary server 310 can identify which chunks are in disk 1 and disk 2. In this example, by checking the metadata, chunks 1-2, 4, 7, 10-11, 13-14, 16 and parities 2-3, 6 are lost.

According to the mapping relationships 302 and 303, as shown in FIG. 3, knowing which chunks are lost and if 1 is set when a chunk is lost, a bitmap of volume A may appear as: {1(chunk 1), 1(chunk 13), 1(chunk 2), 0(chunk 17), 0(chunk 18), 0(chunk 9), 0(chunk 3), 0(chunk 5), 1(chunk 14), 1(chunk 4)}. Here, chunks 1, 13, 2, 14 and 4 are lost and the corresponding bits are set to 1. The chunks 17, 18, 9, 3, 5 are not lost so the corresponding bits are set to 0. As a result, the bitmap corresponding to volume A is {1, 1, 1, 0, 0, 0, 0, 0, 1, 1}. Similarly, the bitmap corresponding to volume b is obtained as {1, 0, 0, 1, 1, 1, 0, 0}. To combine these two bitmaps, we obtain a final bitmap as follows:

| | | | | | | | | | |
|---|---|---|---|---|---|---|---|---|---|
| 1 | 1 | 1 | 0 | 0 | 0 | 0 | 0 | 1 | 1 |
| 1 | 0 | 0 | 1 | 1 | 1 | 0 | 0 | | |

In this embodiment, each chunk needs only 1 bit in the bitmap. For a storage system with size of 1P bytes and a chunk with size of 1M bytes, the overhead will be 125M bytes, which is quite small and affordable.

In some embodiments, the above data loss information is sent to the secondary server 320. The lost data unit is at a first granular data size for the rebuilding. The second data is mirrored from the first data and accesses units at a second granular data size that the application uses to access data. That is, the chunks are the size of the lost data units and of the units for rebuilding. The data in the secondary server 320 (the second data) and data in the primary server 310 (the first data) are block sized mirrored units. Block size is the granularity size that the application uses to access data. In other embodiments, a mapping relationship between the data units of a first granularity size, and the access units of a second granularity size, are stored in the first server. The mapping relationship can be used to determine a position of a bit that represents a data unit in the bitmap. As shown in the above example, according to the mapping relationship stored in the primary server 310, the corresponding bits of the lost chunks are set in their corresponding positions in the bitmap, which also correspond to their respective logical block ranges. In the above example, the data loss information is embodied as a bitmap. However, other forms of data loss information are possible. For example, a bit string or an array can be used as long as they can convey which data is lost and needs to be retrieved from the second server to rebuild the data in the first server. In other embodiments, a value for identifying the chunk size for each volume is needed to be sent to the second server as well. This is because the chunk size may be different for each volume or different in each server. In the above example, the size of a chunk is equal to 100 blocks. However, in other embodiments, the chunk size may have a default value.

After receiving the data loss information, such as the above bitmap, the secondary server 320 scans the bitmap and retrieves the data based on the bitmap. For example, since the first bit in the first row of the above bitmap is set to 1, the secondary server 320 will accordingly retrieve blocks 1-100, of the mirrored volume A, from the secondary server 320. The blocks 1-100 correspond to the lost chunk 1. Since the second bit in the first row of the above bitmap is set to 1, the secondary server 320 will accordingly retrieve blocks 101-200, of the mirrored volume A, on the secondary server 320. The blocks 101-200 corresponds to the lost chunk 13, etc. Once the blocks corresponding to one lost chunk are all retrieved, they are sent to the primary server 310 together. This occurs even if the blocks might not be retrieved from the same chunk in the secondary server 320. The primary server receives the data chunk by chunk. By doing so, only the lost data is retrieved and sent to the primary server for data rebuilding. This minimizes the data size needed to be retrieved and transferred and it also minimizes the time window for data rebuilding.

At step 230, the lost data units in the first data are rebuilt by the first server. The first data is rebuilt by using data that is retrieved from the second data based on the data loss information provided to the second server. The retrieved data may be sent from the second server to the first server. In some embodiments, the retrieved data may be sent from the second server to a third party where the first server may obtain the retrieved data from the third party. Using the stride 501 in FIG. 5 as an example, the last bit in the first row of the sent bitmap is set to 1. The blocks 901-1000 of the mirrored volume A, corresponding with chunk 4, are retrieved from the secondary server 320 and sent to the primary server 310. Once the blocks 901-1000 of mirrored volume A are received, the data is written to a spare disk 2 as chunk 4. After that occurs, the parity 2, in spare disk 1, can be calculated based on chunks 5, 6 and the retrieved chunk 4. Thus, stride 501 is completely restored. The first stride in the primary server 310, the rebuilding process occurs slightly different. Since the parity 1 needs to be calculated, two chunks (chunks 1 and 2) are retrieved from the secondary server 320. For other strides, the data rebuilding process may be similar. Once all the strides are restored, the data rebuilding process is complete. In response to the rebuilding process finishing, the input/output requests are redirected back to the first server. The second data syncs up with the first data of the first server and returns as backup.

In some embodiments, the first server may signal to the second server when it completes the data rebuilding process. For example, the signal may be performed by sending a message or setting a variable. If a new failure occurs in the first server before the end of the data rebuilding, the first server may send a new data loss information to the second server that is in addition to the original data loss information, or the new data loss information may replace the original data loss information. In other embodiments, the first server may continuously signal to the second server until the data rebuilding process is complete.

At step 240, during the data rebuilding process, the data units, other than the lost data units in the first data, are synced up with the corresponding data in the second data of the second server. Utilizing the data loss information, the second server may determine if the data in a block of the first server is held within a lost chunk or held within a functional chunk. In other words, the second server determines if the first server still has a functional copy of a block that is mirrored in the second server. Returning to FIG. 5 as an example, if block 20 of the mirrored volume A, on the secondary server 320, is updated locally by a write I/O request, the corresponding bit in the bitmap is set to 1. This indicates that the corresponding chunk (chunk 1) is rebuilding and the primary server 310 cannot provide mirrored data for this block. The update for block 20 of mirrored volume A will not be mirrored to the primary server 310. On the other hand, if block 350 of mirrored volume A, on the secondary server, is updated locally by a write I/O request, the corresponding bit in the bitmap is set to 0. This indicates that the corresponding chunk (chunk 17) is not lost. Thus, the primary server 310 is able to provide mirrored data for this block. The update to block 350 of mirrored volume A will be mirrored to the primary server 310 as it normally does when there is not a data rebuilding process taking place. By doing so, actual lost data is the only data losing mirroring protection during the data rebuilding process. Most of the data will always have mirroring protection, even if some data is lost.

In some embodiments, the data that is retrieved from the second data may be merged with at least one update before being sent to the first server. For example, after retrieving the data from the second data, and before sending it to the first server, the second server may check its write cache to see if there is an update to the corresponding block. If an update exists, the update is merged onto the block, and the updated merged block is sent to the first server for data rebuilding. By doing so, the rebuilt first data, in the first server, will contain up-to-date data. Additionally, if this embodiment is implemented, parity needs to be calculated for each stride, even if the parity chunk is not lost.

In some embodiments, the lost data units in the first data may include at least a first lost data unit and a second lost data unit. In response to the first lost data unit being rebuilt, the rebuilt first lost data unit is synced with the corresponding data of the second data, in the second server. For example, as soon as a lost data unit (e.g., a chunk) is recovered in the first server, it provides data mirroring for the corresponding data in the second server. This occurs even if other lost data units in the first server are still rebuilding. By doing so, the backup protection can be restored as soon as possible for as much data as possible, without the need of waiting for the completion of the data rebuilding process of all lost data units.

Although the above embodiments are described utilizing a RAID 5 configuration as an example, the disclosure is applicable to other systems such as erasure code, RAID 4, or RAID 6 as long as a backup copy is available.

The present disclosure may be a system, a process, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for data rebuilding, the method comprising:
   detecting a failure on a first server that stores a first data and that processes input/output requests from an application, wherein at least two disks in a redundant array of independent disks (RAID) configuration and storing the first data have failed;
   redirecting incoming input/output requests from the application to a second server storing a second data, wherein the second data is mirrored from the first data;
   forming, by the first server, a data loss information that identifies lost data units in the first data, the data loss information including a bitmap having a plurality of bits, each bit represents a data unit, the bitmap includes a collection of bitmaps representing volumes relating to the first data, wherein the bitmap is organized by the volumes where each row of bits represents a volume and each bit represents a block range of the volumes within the two disks, wherein a value of each bit in the bitmap indicates if the data unit corresponds with a lost data unit requiring data rebuilding;
   transmitting the data loss information to the second server to recover the lost data units;
   retrieving blocks of data corresponding to the lost data units notated in the bitmap from the second server, wherein the blocks of data from the second server are updated based on a write cache on the second server;
   rebuilding, by the first server, the lost data units in the first data, by using the blocks of data provided by the second server; and
   syncing up available first data units other than the lost data units in the first data with corresponding available second data units in the second data.

2. The method according to claim 1, further comprising:
   in response to the rebuilding being finished,
      directing the input/output requests back to the first server, and
      syncing up the second data with the first data.

3. The method according to claim 1, wherein the data unit is at a first granularity size for the rebuilding of the lost data units in the first data, and wherein the second data is mirrored from the first data in access units at a second granularity size that the application uses to access data.

4. The method according to claim 3, wherein a mapping relationship comprises of the data units with the first granularity size and the access units with the second granularity size, the mapping relationship being stored in the first server.

5. The method according to claim 1, wherein the lost data units in the first data include at least a first lost data unit and a second lost data unit, and wherein in response to the first lost data unit being rebuilt, the rebuilt first lost data unit is synced up with corresponding data in the second data in the second server.

6. The method according to claim 1, wherein the second data units that are retrieved from the second data are merged with at least one update before being sent to the first server.

7. A system for data rebuilding, the system comprising:
   a processor;
   a memory coupled to the processor;
   a set of computer program instructions stored in the memory and executed by the processor in order to perform actions of:
   detecting a failure on a first server that stores a first data and that processes input/output requests from an application, wherein at least two disks in a RAID configuration and storing the first data have failed;
   redirecting incoming input/output requests from the application to a second server storing a second data, wherein the second data is mirrored from the first data;
   forming, by the first server, a data loss information that identifies lost data units in the first data, the data loss information including a bitmap having a plurality of bits, each bit represents a data unit, the bitmap includes a collection of bitmaps representing volumes relating to the first data, wherein the bitmap is organized where each row of bits represents a volume and each bit represents a block range of the volume, wherein a value of each bit in the bitmap indicates if the data unit corresponds with a lost data unit requiring data rebuilding;
   transmitting the data loss information to the second server to recover the lost data units;
   retrieving blocks of data corresponding to the lost data units notated in the bitmap from the second server;
   rebuilding, by the first server, the lost data units in the first data, by using the blocks of data provided by the second server; and
   syncing up available first data units other than the lost data units in the first data with corresponding available second data units in the second data.

8. The system according to claim 7, wherein the system further comprises a set of computer program instructions stored in the memory and executed by the processor in order to perform action of:
   in response to the rebuilding being finished,
      directing the input/output requests back to the first server, and
      syncing up the second data with the first data.

9. The system according to claim 7, wherein the data unit is at a first granularity size for the rebuilding of the lost data units in the first data, and wherein the second data is mirrored from the first data in access units at a second granularity size that the application uses to access data.

10. The system according to claim 9, wherein a mapping relationship comprises of the data units with the first granularity size and the access units with the second granularity size, the mapping relationship being stored in the first server.

11. The system according to claim 7, wherein the lost data units in the first data include at least a first lost data unit and a second lost data unit, and wherein in response to the first lost data unit being rebuilt, the rebuilt first lost data unit is synced up with corresponding data in the second data in the second server.

12. The system according to claim 7, wherein the second data units that are retrieved from the second data are merged with at least one update before being sent to the first server.

13. A computer program product having computer executable instructions that when executed by a computer having at least one processor cause the computer to: detect a failure on a first server that stores a first data and that processes input/output requests from an application, wherein at least two disks in a RAID configuration and storing the first data have failed; redirect incoming input/output requests from the application to a second server storing a second data, wherein the second data is mirrored from the first data, wherein a data unit is at a first granularity size for rebuilding and wherein the second data is mirrored from the first data in access units at a second granularity size that the application uses to access data; form, by the first server, a data loss information that identifies lost data units in the first data, the data loss information including a bitmap having a plurality of bits, each bit represents a data unit, the bitmap includes a collection of bitmaps representing volumes relating to the first data, wherein the bitmap is organized where each row of bits represents a volume and each bit represents a block range of the volume within the two disks; wherein a volume of each bit in the bitmap indicates if the data unit corresponds with a lost data unit requiring data rebuilding; transmit the data loss information to the second server to recover the lost data units, wherein the lost data units in the first data include at least a first lost data unit and a second lost data unit, and wherein in response to the first lost data unit being rebuilt, the rebuilt first lost data unit is synced up with corresponding data in the second data in the second server; retrieve blocks of data correspond to the lost data units notated in the bitmap from the second server; rebuild, by the first server, the lost data units in the first data, by using the second data and the data loss information provided to the second server; sync up available first data units other than the lost data units in the first data with corresponding available second data units in the second data; direct the input/output request back to the first server; and sync up the second data with the first data, wherein a mapping relationship comprises of the data units with the first granularity size and the access units with the second granularity size, the mapping relationship being stored in the first server.

* * * * *